US012696321B2

(12) United States Patent
Jiang et al.

(10) Patent No.: US 12,696,321 B2
(45) Date of Patent: Jul. 28, 2026

(54) METHOD FOR PROCESSING PRACH SIGNAL

(71) Applicant: CCTEG CHINA COAL RESEARCH INSTITUTE, Beijing (CN)

(72) Inventors: Yufeng Jiang, Beijing (CN); Liya Zhang, Beijing (CN); Wenzhen Wu, Beijing (CN); Qingyong Meng, Beijing (CN); Kebing Wang, Beijing (CN)

(73) Assignee: CCTEG China Coal Research Institute, Beijing (CN)

( * ) Notice: Subject to any disclaimer, the term of this patent is extended or adjusted under 35 U.S.C. 154(b) by 416 days.

(21) Appl. No.: 18/551,339

(22) PCT Filed: May 24, 2022

(86) PCT No.: PCT/CN2022/094758
§ 371 (c)(1),
(2) Date: Sep. 19, 2023

(87) PCT Pub. No.: WO2023/123835
PCT Pub. Date: Jul. 6, 2023

(65) Prior Publication Data
US 2024/0196443 A1    Jun. 13, 2024

(30) Foreign Application Priority Data

Dec. 29, 2021    (CN) .......................... 202111640183.X

(51) Int. Cl.
*H04W 74/0833*    (2024.01)
*H04W 74/00*    (2009.01)

(52) U.S. Cl.
CPC ..... *H04W 74/0833* (2013.01); *H04W 74/002* (2013.01)

(58) Field of Classification Search
None
See application file for complete search history.

(56) References Cited

U.S. PATENT DOCUMENTS

| | | | | |
|---|---|---|---|---|
| 10,448,432 | B1 * | 10/2019 | Chu ................. | H04W 74/0833 |
| 2017/0094686 | A1 * | 3/2017 | Ramamurthi ....... | H04L 27/2633 |

(Continued)

FOREIGN PATENT DOCUMENTS

| | | | |
|---|---|---|---|
| CN | 101656702 | A * | 2/2010 |
| CN | 106443658 | A | 2/2017 |

(Continued)

OTHER PUBLICATIONS

International Search Report corresponding to PCT Application No. PCT/CN2022/094758, mailed Aug. 31, 2022 (Chinese and English language document) (5 pages).

(Continued)

*Primary Examiner* — Khaled M Kassim
*Assistant Examiner* — Shima Wasel
(74) *Attorney, Agent, or Firm* — Maginot, Moore & Beck, LLP

(57) ABSTRACT
A PRACH signal processing method, including: obtaining an initial signal, in which the initial signal has corresponding period information; obtaining a signal to be processed by performing a target processing on the initial signal based on the period information; and obtaining a target frequency domain signal by performing a frequency domain transformation on the signal to be processed.

14 Claims, 2 Drawing Sheets obtaining an initial signal, in which the initial signal has corresponding period information ⟋ S101 obtaining a signal to be processed by performing a target processing on the initial signal based on the period information ⟋ S102 obtaining a target frequency domain signal by performing a frequency domain transform on the signal to be processed ⟋ S103

(56) References Cited

U.S. PATENT DOCUMENTS

| | | | | |
|---|---|---|---|---|
| 2020/0383147 A1* | 12/2020 | Yoon | .................. | H04L 27/2605 |
| 2021/0091990 A1* | 3/2021 | Yang | .................... | H04L 1/0071 |
| 2021/0092779 A1* | 3/2021 | Tang | ................... | H04L 27/2602 |
| 2023/0189343 A1* | 6/2023 | Rao | ....................... | H04L 5/0023 |
| | | | | 370/329 |
| 2023/0421424 A1* | 12/2023 | Zhong | .............. | H04L 25/03993 |
| 2024/0305404 A1* | 9/2024 | Li | ......................... | H04L 1/0026 |

FOREIGN PATENT DOCUMENTS

| | | | | | |
|---|---|---|---|---|---|
| CN | 108594195 A | | 9/2019 | | |
| CN | 110881215 A | * | 3/2020 | ........ | H04W 56/0005 |
| CN | 112767959 A | | 5/2021 | | |
| CN | 114501672 A | | 5/2022 | | |
| WO | 2015/158296 A1 | | 10/2015 | | |
| WO | 2021/189642 A1 | | 9/2021 | | |

OTHER PUBLICATIONS

OA for CN application 202111640183.X.
English translation of OA for CN application 202111640183.X.

* cited by examiner

METHOD FOR PROCESSING PRACH SIGNAL

CROSS REFERENCE TO RELATED APPLICATIONS

This application a U.S. national phase of International Application No. PCT/CN2022/094758, filed on May 24, 2022, which is based on and claims priority to Chinese patent application No. 202111640183.X, filed on Dec. 29, 2021, the entire contents of which are incorporated herein by reference.

TECHNICAL FIELD

The disclosure relates to a field of communication technology, in particular to a method for processing a Physical Random Access Channel (PRACH) signal.

BACKGROUND

In the related art, when performing signal processing on an uplink Physical Random Access Channel (PRACH) random baseband signal in 5th Generation (5G) mobile communication, the computation process is complicated and generally requires a large amount of computation, which is difficult to meet the demands of real-time performance and power consumption.

SUMMARY

According to a first aspect of the embodiments of the disclosure, a method for processing a PRACH signal is provided. The method includes: obtaining an initial signal, in which the initial signal has corresponding period information; obtaining a signal to be processed by performing a target processing on the initial signal based on the period information; and obtaining a target frequency domain signal by performing a frequency domain transformation on the signal to be processed.

According to a second aspect of the embodiments of the disclosure, an electronic device is provided. The electronic device includes: a memory, a processor and computer programs stored on the memory and executable on the processor. When the computer programs are executed by the processor, the method for processing a PRACH signal provided by the first aspect of the embodiments of the disclosure is implemented.

According to a third aspect of the embodiments of the disclosure, a non-transitory computer readable storage medium having computer programs stored thereon is provided. When the computer programs are executed by a processor, the method for processing a PRACH signal provided by the first aspect of the embodiments of the disclosure is implemented.

Additional aspects and advantages of disclosure will be given in part in the following descriptions, become apparent in part from the following descriptions, or be learned from the practice of the embodiments of the disclosure.

BRIEF DESCRIPTION OF THE DRAWINGS

The above and/or additional aspects and advantages of embodiments of the disclosure will become apparent and more readily appreciated from the following descriptions made with reference to the accompanying drawings, in which.

DETAILED DESCRIPTION

The embodiments of the disclosure are described in detail below, and examples of the embodiments are shown in the accompanying drawings, in which the same or similar numbers indicate the same or similar components or components having the same or similar functions. The embodiments described below with reference to the accompanying drawings are exemplary and are intended to be used to explain the disclosure and are not to be construed as limiting the disclosure. Instead, embodiments of the disclosure include all variations, modifications, and equivalents that fall within the spirit and scope of the appended claims.

The disclosure aims to solve one of the technical problems in the related art at least to some extent.

In this respect, the disclosure aims to provide a method for processing a Physical Random Access Channel (PRACH) signal, an apparatus for processing a PRACH signal, an electronic device, a storage medium and a computer program product, to effectively reduce an amount of computation during execution of the method for processing a PRACH signal, thus effectively increasing a speed of computation and reducing a power consumption of signal processing, which is more conducive to an implementation of hardware.

Figure 1:
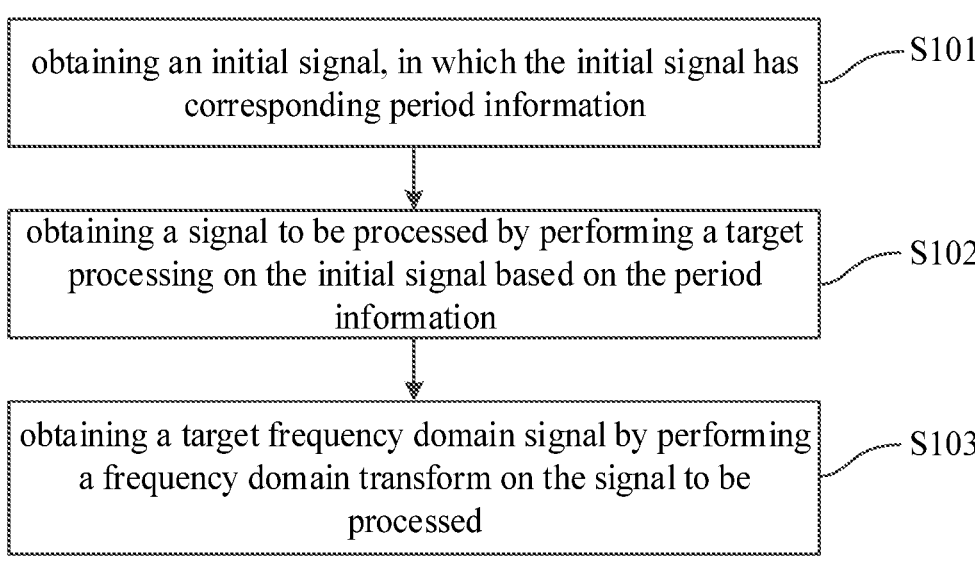
FIG. 1 is a flowchart of a method for processing a Physical Random Access Channel (PRACH) signal according to an embodiment of the disclosure.

FIG. 1 is a flowchart of a method for processing a Physical Random Access Channel (PRACH) signal according to an embodiment of the disclosure.

It is noted that an execution body of the method for processing a PRACH signal of the embodiment is an apparatus for processing a PRACH signal. The apparatus may be realized by way of software and/or hardware. The apparatus can be configured in an electronic device, which may include, but is not limited to, a terminal, a server, and the like.

As illustrated in FIG. 1, the method for processing a PRACH signal includes the following steps.

At step S101, an initial signal is obtained, in which the initial signal has corresponding period information.

An unprocessed signal obtained in an initial stage of the execution of the signal processing method may be referred to as the initial signal.

Information used to describe the period of the initial signal may be referred to as the period information. For example, the period information may be a signal period of the initial signal, which is not limited herein.

In the embodiment of the disclosure, obtaining the initial signal may be obtaining a 5G uplink PRACH random access baseband signal, and determining the baseband signal as the initial signal. The initial signal may be represented as:

$$s_i^{(p,\mu)}(t) = \sum_{k=0}^{L_{RA}-1} \beta_{PRACH} y_{u,v}(n) e^{j2\pi(k+\varphi+k(k_0+1/2))\Delta f_{RA}(t-T_{cp})} \quad (1)$$

3 where $$s_1^{(p,\mu)}(t)$$

represents a time-domain continuous signal of a PRACH at
an antenna port p, t represents a time sequence number, $\Delta f_{RA}$
represents a subcarrier spacing of a random access preamble,
K represents a difference between a subcarrier spacing of the
random access preamble and a subcarrier spacing of uplink
data, $\mu$ represents subcarrier spacing configuration, $\beta_{PRACH}$
represents a power control adjustment factor, $\varphi$ represents a
fixed frequency domain offset, $L_{RA}$ represents a sequence
length corresponding to the initial signal, u represents a root
sequence index, $k_0$ represents a starting location of a
resource block occupied by the PRACH, k represents an
index of a resource block within an occupied bandwidth, $T_{cp}$
represents a length of a cyclic prefix, n represents a sequence
index, $y_{u,v}(n)$ represents a frequency-domain Zadoff-Chu
sequence, and j represents an imaginary component with a
value of $$\sqrt{-1}.$$

The above $y_{u,v}(n)$ can be represented as:

$$y_{u,v}(n) = \sum_{m=0}^{L_{RA}-1} x_{u,v}(m)e^{-j\frac{2\pi mn}{L_{RA}}} \tag{2}$$

where m represents a sequence index, $L_{RA}$ represents a
sequence length corresponding to the initial signal, and
$x_{u,v}(m)$ represents a Zadoff-Chu sequence with cyclic shifts.

In the embodiment of the disclosure, after obtaining the
initial signal, the period information corresponding to the
initial signal may be determined, then the initial signal is
processed according to the period information correspond-
ing to the initial signal, and details can be found in subse-
quent embodiments.

At step S102, a signal to be processed is obtained by
performing a target processing on the initial signal based on
the period information.

In the embodiment of the disclosure, after obtaining the
initial signal and determining the period information corre-
sponding to the initial signal, a demand processing may be
performed on the initial signal based on the period infor-
mation. The demand processing may be referred to as the
target processing, and the signal obtained by performing the
target processing is determined as the signal to be processed.

In some embodiments, performing the target processing
on the initial signal based on the period information may be
performing a transformation processing on the initial signal
based on the period information. For example, a time
domain transformation processing or a frequency domain
transformation processing is performed on the initial signal
to obtain the signal to be processed. Alternatively, a sam-
pling processing is performed on the initial signal based on
the period information, and part of the initial signal obtained
by performing the sampling processing is determined as the
signal to be processed, which is not limited herein.

At step S103, a target frequency domain signal is obtained
by performing a frequency domain transformation on the
signal to be processed.

That is, in the embodiment of the disclosure, the signal to
be processed is obtained by performing the target processing
on the initial signal. During subsequent execution process of
the method for processing a PRACH signal, a first amount
of computation for performing the frequency domain trans-
formation on the signal to be processed is less than a second
amount of computation for performing the frequency
domain transformation on the initial signal. Therefore, the
amount of computation can be effectively reduced during the
execution of the method for processing a PRACH signal,
and a computation complexity can be effectively reduced,
which can effectively improve a signal processing efficiency.

The first amount of computation is an amount of compu-
tation for performing the frequency domain transformation
on the signal to be processed. Correspondingly, the second
amount of computation is an amount of computation for
performing the frequency domain transformation on the
initial signal.

Optionally, in some embodiments, performing the fre-
quency domain transformation on the signal to be processed
may be performing a Discrete Fourier Transformation (DFT)
on the signal to be processed, to obtain the target frequency
domain signal.

That is, in the embodiment of the disclosure, after the
signal to be processed is obtained by performing the target
processing on the initial signal, the DFT is performed on the
signal to be processed, to obtain a corresponding frequency
domain signal, which may be referred to as the target
frequency domain signal.

Alternatively, the frequency domain transformation may
also be performed on the signal to be processed using any
other possible frequency domain transformation ways, to
obtain the target frequency domain signal, which is not
limited herein.

In the embodiment, the initial signal is obtained, and the
initial signal has corresponding period information. The
target processing is performed on the initial signal according
to the period information to obtain the signal to be pro-
cessed. The frequency domain transformation is performed
on the signal to be processed to obtain the target frequency
domain signal. Therefore, the amount of computation can be
effectively reduced during execution of the method for
processing a PRACH signal, thus the speed of computation
can be effectively increased, and the power consumption of
signal processing can be reduced, which is more conducive
to the implementation of hardware.

Figure 2:
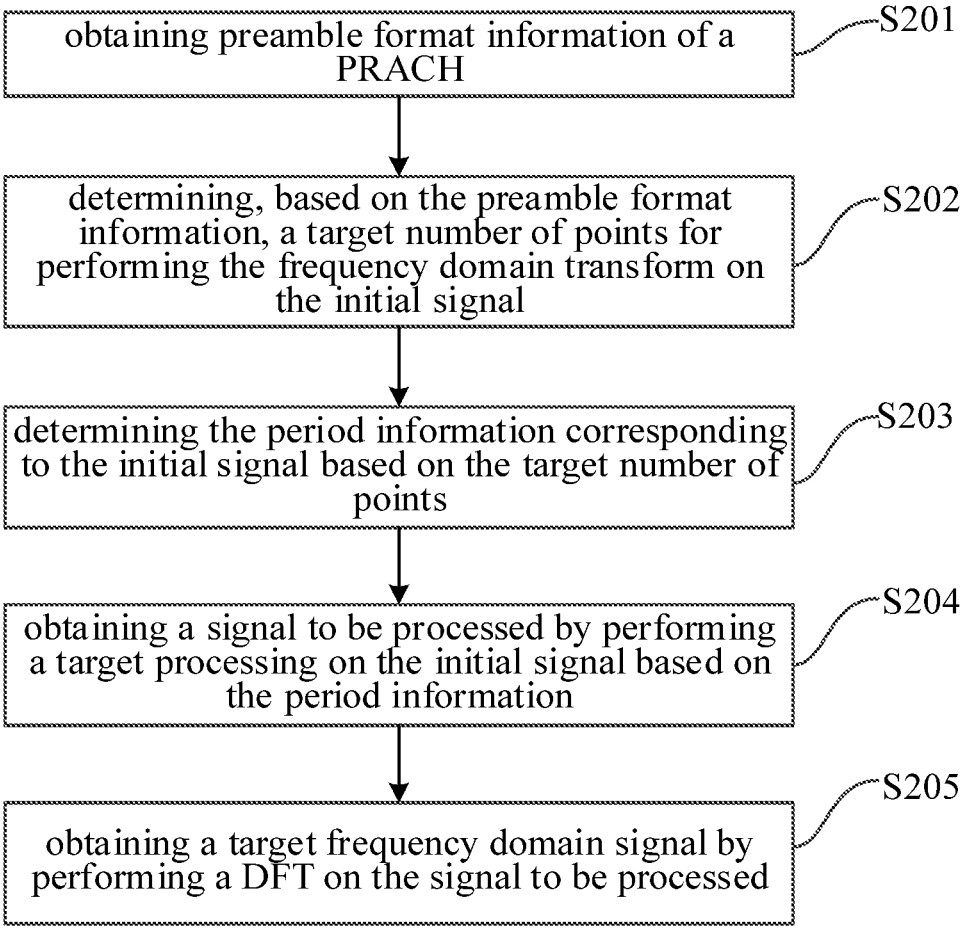
FIG. 2 is a flowchart of a method for processing a PRACH signal according to another embodiment of the disclosure.

FIG. 2 is a flowchart of a method for processing a PRACH
signal according to another embodiment of the disclosure.

As illustrated in FIG. 2, the method for processing a
PRACH signal includes the following steps.

At step S201, preamble format information of a PRACH
is obtained.

The PRACH may have a variety of corresponding pre-
amble formats. Correspondingly, information used to
describe the preamble formats of the PRACH may be
referred to as preamble format information. The preamble
format information may be a preamble format of the
PRACH, which may be, for example, format 1, format 2,
and format 3. The preamble format information may also be
used to describe a preamble sequence corresponding to a
PRACH random access baseband signal. The preamble
sequence may be, for example, a Zadoff-Chu sequence,
which is not limited herein.

In the embodiment of the disclosure, after the initial signal
is determined, an initial Zadoff-Chu sequence may be
obtained based on a frequency-domain Zadoff-Chu sequence $y_{u,v}(n)$ corresponding to the initial signal. The initial Zadoff-Chu sequence may be represented as:

$$x_u(i) = e^{-j\frac{\pi u i(i+1)}{L_{RA}}}, i = 0, 1, \ldots, L_{RA} - 1; \qquad (3)$$

where u represents a root sequence index, $L_{RA}$ represents a sequence length, i represents a sequence index, and $x_u(i)$ represents the initial Zadoff-Chu sequence.

The initial Zadoff-Chu sequence determined by Equation (3) can be cyclically shifted, to obtain a cyclically shifted Zadoff-Chu sequence, and the sequence $x_{u,v}(n)$ can be represented as:

$$x_{u,v}(n) = x_u((n+C_v)\text{mod } L_{RA}) \qquad (4);$$

where $x_{u,v}(n))$ represents a preamble of the PRACH, u represents a root sequence index, $C_v$ represents a cyclic shift, n represents a sequence index, $x_u$ represents a $u^{th}$ root sequence, and $L_{RA}$ represents a sequence length.

In the embodiment of the disclosure, each time-frequency resource of the PRACH may define 64 preambles, which may correspond to different combinations of root sequence indexes u and cyclic shifts $C_v$. After determining the time-domain Zadoff-Chu sequence $x_{u,v}(n)$, a plurality of pieces of preamble format information corresponding to the time-domain Zadoff-Chu sequence $x_{u,v}(n)$ can be determined. The plurality of pieces of preamble format information can be shown in the following Table 1 and Table 2. Table 1 shows corresponding preamble format information when the preamble format of the PRACH is 0, 1, 2, 3, when $L_{RA}=839$ and when $\Delta f_{RA} \in \{1.25, 5\}$ kHz. Table 2 shows corresponding preamble format information when the preamble format of PRACH is A1, A2, A3, B1, B2, B3, B4, C0, C2, when $L_{RA} \in \{139, 571, 1151\}$, and when $\Delta f_{RA}=15\cdot2^\mu$ KHz. $\Delta f_{RA}$ represents a subcarrier spacing of a random access preamble, $L_{RA}$ represents a sequence length, and $\mu$ represents a subcarrier spacing configuration.

TABLE 1

| preamble format | $L_{RA}$ | $\Delta f_{RA}$ | support for restricted set |
|---|---|---|---|
| 0 | 839 | 1.25 kHz | Type A, Type B |
| 1 | 839 | 1.25 kHz | Type A, Type B |
| 2 | 839 | 1.25 kHz | Type A, Type B |
| 3 | 839 | 5 kHz | Type A, Type B |

TABLE 2

| preamble format | $L_{RA}$ | | | $\Delta f_{RA}$ | support for restricted set |
|---|---|---|---|---|---|
| | $\mu \in \{0, 1, 2, 3\}$ | $\mu = 0$ | $\mu = 1$ | | |
| A1 | 139 | 1151 | 571 | $15 \cdot 2^\mu$ kHz | — |
| A2 | 139 | 1151 | 571 | $15 \cdot 2^\mu$ kHz | — |
| A3 | 139 | 1151 | 571 | $15 \cdot 2^\mu$ kHz | — |
| B1 | 139 | 1151 | 571 | $15 \cdot 2^\mu$ kHz | — |
| B2 | 139 | 1151 | 571 | $15 \cdot 2^\mu$ kHz | — |
| B3 | 139 | 1151 | 571 | $15 \cdot 2^\mu$ kHz | — |
| B4 | 139 | 1151 | 571 | $15 \cdot 2^\mu$ kHz | — |
| C0 | 139 | 1151 | 571 | $15 \cdot 2^\mu$ kHz | — |
| C2 | 139 | 1151 | 571 | $15 \cdot 2^\mu$ kHz | — |

At step S202, a target number of points for performing the frequency domain transformation on the initial signal is determined based on the preamble format information.

In the embodiment of the disclosure, different lengths of the Zadoff-Chu sequence may correspond to preamble formats in different forms. For the preamble formats in different forms, when the system bandwidths are different, the numbers of sampling points required for the frequency domain transformation are also different, and subsequent operations may also be different.

Therefore, after obtaining the time-domain Zadoff-Chu sequence of the PRACH, a form corresponding to the preamble sequence can be determined based on a length of the preamble sequence. A number of frequency-domain sampling points required to perform the frequency domain transformations on the initial signal is determined, which can be referred to as the target number of points.

In the embodiment of the disclosure, as shown in Tables 1, 2 above, it can be determined that the target number of points for performing the frequency domain transformation on the initial signal can be 139, 571, 839, or 1151, and a larger amount of computation is required when performing the frequency domain transformation with the target number of points. Therefore, the target processing can be performed on the initial signal to reduce the target number of points required for processing the initial signal, thereby effectively reducing the amount of computation and improving the signal processing efficiency.

At step S203, the period information corresponding to the initial signal is determined based on the target number of points.

In the embodiment of the disclosure, after determining the target number of points, the period information $L_{RA} \in \{139, 571, 839, 1151\}$ corresponding to the initial signal is determined based on the target number of points and the preamble format information given in the Tables 1 and 2. The initial signal may be processed according to the period information to obtain a signal to be processed, which may be described in subsequent embodiments.

At step S204, a signal to be processed is obtained by performing a target processing on the initial signal based on the period information.

Optionally, in some embodiments, obtaining the signal to be processed by performing the target processing on the initial signal based on the period information may be as following. A first sequence number parameter in the initial signal is obtained. A multiplicative inverse corresponding to the first sequence number parameter is determined based on the period information. A sequence of parameters corresponding to the period information is determined, in which the sequence of parameters includes a plurality of second sequence number parameters. A plurality of target sequence values corresponding to the plurality of second sequence number parameters are determined respectively based on the initial signal. A plurality of target conjugate values corresponding to the plurality of target sequence values are extracted respectively. The signal to be processed is obtained by summing up the plurality of target conjugate values based on the initial signal.

The first sequence number parameter of the initial signal is a root sequence index u of the Zadoff-Chu sequence corresponding to the initial signal, which is not limited herein.

The multiplicative inverse corresponding to the first sequence number parameter can be a multiplicative inverse $u^{-1}$ of the root sequence index u modulo $L_{RA}$. For example, if $L_{RA}=839$ and u=129, $u^{-1}=826$.

The sequence of parameters corresponding to the periodic information may be the sequence expressed in the above equation (4), which may correspond to n parameters and may have a corresponding value range. The value range may be called the second sequence number parameters, which may be, for example, n=0, 1, . . . , $L_{RA}-1$.

When n in the equation (4) takes on different values, multiple values can be obtained separately by calculation. The obtained values can be called the plurality of target sequence values.

In the embodiment of the disclosure, after determining the plurality of target sequence values corresponding to the plurality of second sequence number parameters, the plurality of target conjugate values corresponding to the plurality of target sequence values are extracted, and the signal to be processed is obtained by summing up the plurality of target conjugate values based on the initial signal.

In the embodiment of the disclosure, the process of obtaining the signal to be processed by processing the initial signal based on the period information may be provided as follows.

The above equation (3) can be expanded, for example, $$z_u(i) = e^{-j\frac{\pi u i(i+1)}{L_{RA}}}, \tag{4}$$

i is an integer;

thus, when i=0, 1, . . . , $L_{RA}-1$, $x_u(i)=z_u(i)$, and the equation can be expanded as:

$$z_u(i + L_{RA}) = e^{-j\frac{\pi u(i+L_{RA})(i+L_{RA}+1)}{L_{RA}}} = e^{-j\frac{\pi u i(i+1)}{L_{RA}}} e^{-j\pi u(2i+L_{RA}+1)}; \tag{5}$$

When $L_{RA} \in \{139, 571, 839, 1151\}$, $(2i+L_{RA}+1)$ in the above equation (5) is an even number, and as a result, $e^{-j\pi u(2i+L_{RA}+1)}=1$. At this time, the above equation can be transformed as:

$$z_u(i + L_{RA}) = e^{-j\frac{\pi u i(i+1)}{L_{RA}}} = z_u(i); \tag{6}$$

where $z_u(i)$ is periodic, and its period is $L_{RA}$.

In addition, in $(n+C_v) \bmod L_{RA}$ of the above equation (4), the value of n is in a range of 0, 1, . . . , $L_{RA}-1$. On the basis, $x_{u,v}(u^{-1}n)=x_{u,v}((u^{-1}n) \bmod L_{RA})$ corresponding to n=0, 1, . . . , $L_{RA}-1$ can be calculated, and the conjugate value is taken as $x_{u,v}^*(u^{-1}n)$. The period of $z_u(i)$ is $L_{RA}$, then the following equation can be obtained as:

$$x_{u,v}(n) = x_u((n + C_v) \bmod L_{RA}) = z_u(n + C_v) = e^{-j\frac{\pi u(n+C_v)(n+C_v+1)}{L_{RA}}}; \tag{7}$$

The above equation (7) is substituted into the equation (2) and then the following equation can be obtained:

$$y_{u,v}(n) = \sum_{m=0}^{L_{RA}-1} x_{u,v}(m) \cdot e^{-j\frac{2\pi mn}{L_{RA}}} = \tag{8}$$

$$\sum_{m=0}^{L_{RA}-1} e^{-j\frac{\pi u(n+C_v)(n+C_v+1)}{L_{RA}}} \cdot e^{-j\frac{2\pi mn}{L_{RA}}} = e^{j\frac{\pi u(u^{-1}n)(u^{-1}n+1)+2\pi uu^{-1}nC_v}{L_{RA}}}$$

$$\sum_{m=0}^{L_{RA}-1} e^{-j\frac{\pi u(u^{-1}n)(u^{-1}n+1)+2\pi uu^{-1}nC_v}{L_{RA}}} \cdot e^{-j\frac{\pi u(m+C_v)(m+C_v+1)+2\pi uu^{-1}mn}{L_{RA}}}$$

where $u^{-1}$ is the multiplicative inverse of the first sequence number parameter u modulo $L_{RA}$, i.e., $(uu^{-1}) \bmod L_{RA}=1$, thus, the equation (9) can be obtained by organizing the equation (8) above as:

$$y_{u,v}(n) = e^{j\frac{\pi u(u^{-1}n+C_v)(u^{-1}n+C_v+1)}{L_{RA}}} e^{-j\frac{\pi u(C_v C_v+C_v)}{L_{RA}}}$$

$$\sum_{m=0}^{L_{RA}-1} e^{-j\pi u\frac{(m+u^{-1}n+C_v)(m+u^{-1}n+C_v+1)}{L_{RA}}};$$

According to the equation (7), it can be organized to obtain:

$$e^{j\frac{\pi u(u^{-1}n+C_v)(u^{-1}n+C_v+1)}{L_{RA}}} = x_{u,v}^*(u^{-1}n); \tag{10}$$

$$\sum_{m=0}^{L_{RA}-1} e^{-j\pi u\frac{(m+u^{-1}n+C_v)(m+u^{-1}n+C_v+1)}{L_{RA}}} = \sum_{m=0}^{L_{RA}-1} x_{u,v}(m + u^{-1}n); \tag{11}$$

According to the above equation (2), it can be organized to obtain:

$$\sum_{m=0}^{L_{RA}-1} x_{u,v}(m) = y_{u,v}(0); \tag{12}$$

According to the above equation (4), it is determined that $x_{u,v}(n)$ is periodic, and its period is $L_{RA}$. According to the above equation (12), it can be organized to obtain:

$$\sum_{m=0}^{L_{RA}-1} x_{u,v}(m + u^{-1}n) = \sum_{m=0}^{L_{RA}-1} x_{u,v}(m) \tag{13}$$

According to the above equation (2), the equation (13) can be organized to obtain:

$$\sum_{m=0}^{L_{RA}-1} x_{u,v}(m) = y_{u,v}(0) \tag{14}$$

In conclusion, the above equation (9) can be organized to obtain:

$$y_{u,v}(n) = x_{u,v}^*(u^{-1}n)e^{-j\frac{\pi u(C_v C_v+C_v)}{L_{RA}}} y_{u,v}(0); \tag{15}$$

It should be noted that as a common phase, $$e^{-j\frac{\pi u(C_v C_v+C_v)}{L_{RA}}}$$

can be removed when launching the sequence, i.e., the hardware only generates:

$$y_{u,v}(n)=x_{u,v}^*(u^{-1}n)y_{u,v}(0); \tag{16}$$

In conclusion, the equation (2) is rewritten as the equation (16). The complex process of "summing up products of power operations" is transformed into a simple process of "sequence sum and multiplication". That is, the corresponding complex Zadoff-Chu sequence representation in the initial signal is converted into a simpler Zadoff-Chu sequence representation, and a signal corresponding to the simpler Zadoff-Chu sequence can be referred to as the signal to be processed.

It should be noted that in the embodiment of the disclosure, the descriptive illustration for the meaning of the same equation parameters involved in the equations (4) to (16) can be found in the descriptive illustration for the equation parameters in the above embodiments, and will not be repeated herein.

In some embodiments, after rewriting the equation (2) into the equation (16), the consistency between the two equations can be verified.

For example, all possible combinations of $L_{RA}$, u and $C_v$ are traversed to evaluate a maximum value Delta of a relative deviation of the equation (2) and the equation (16):

$$Delta_{L_{RA},u,C_v} = \max\left(abs\left(x_{u,v}^*(u^{-1}n)e^{-j\frac{\pi u(C_v C_v + C_v)}{L_{RA}}}y_{u,v}(0) - \sum_{m=0}^{L_{RA}-1}x_{u,v}(m)e^{-j\frac{2\pi mn}{L_{RA}}}\right)\right);$$

where u represents the root sequence index, $C_v$ represents the cyclic shift, $L_{RA}$ represents the sequence length, and n represents the sequence index.

Four lengths of Zadoff-Chu sequences are supported in the PRACH, i.e., $L_{RA} \in \{139, 571, 839, 1151\}$. The value range of u is $\{1, 2, 3, \ldots, L_{RA}-1\}$. However, the value range of $C_v$ is a subset of $\{0, 1, 2, \ldots, L_{RA}-1\}$, $\{0, 1, 2, \ldots, L_{RA}-1\}$ are traversed for $C_v$ in simulation.

When $L_{RA}=139$, 138*139=19182 combinations of u and $C_v$ are traversed, and the maximum value of Delta is 2.2255e-10. When $L_{RA}=571$, 570*571=325470 combinations of u and $C_v$ are traversed, and the maximum value of Delta is 9.0374e-09. When $L_{RA}=839$, 838*839=703082 combinations of u and $C_v$ are traversed, and the maximum value of Delta is 3.0870e-08. When $L_{RA}=1151$, 1150*1151=1323650 combinations of u and $C_v$ are traversed, and the maximum value of Delta is 6.0016e-08. Data truncation in the calculation process leads to a small computational deviation, that is, Delta should all tend to be equal to 0. Therefore, it can be determined that the equation (2) and the equation (16) have consistency, and the signal to be processed corresponding to the sequence represented by equation (16) can be processed, to obtain the target frequency domain signal.

At step S205, the target frequency domain signal is obtained by performing a DFT on the signal to be processed.

The descriptive illustration of step S205 can be found specifically in the above embodiments and will not be repeated herein.

In the embodiment, the preamble format information of the PRACH is obtained. The target number of points for performing the frequency domain transformation on the initial signal is determined based on the preamble format information. The period information corresponding to the initial signal is determined based on the target number of points. The signal to be processed is obtained by performing the target processing on the initial signal based on the period information. The target frequency domain signal is obtained by performing the DFT on the signal to be processed. Therefore, the Zadoff-Chu sequence corresponding to the initial signal randomly accessed by the PRACH is simplified, so that when performing the signal processing on the signal to be processed corresponding to the simplified Zadoff-Chu sequence, the amount of computation can be effectively reduced, thus the speed of computation can be effectively increased, and the power consumption of signal processing can be effectively reduced, which is more conducive to the implementation of hardware.

Figure 3:
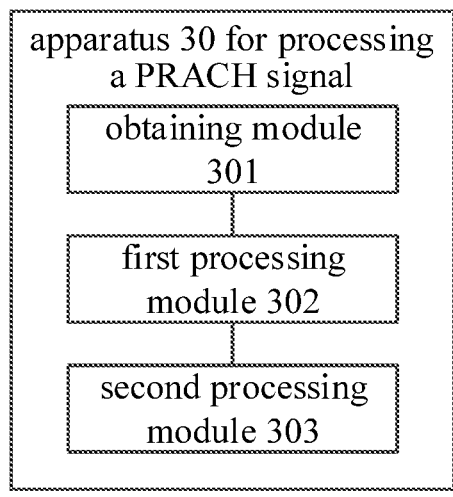
FIG. 3 is a block diagram of an apparatus for processing a PRACH signal according to an embodiment of the disclosure.

FIG. 3 is a block diagram of an apparatus 30 for processing a PRACH signal according to an embodiment of the disclosure.

As illustrated in FIG. 3, the apparatus 30 includes:

an obtaining module 301, configured to obtain an initial signal, in which the initial signal has corresponding period information;

a first processing module 302, configured to obtain a signal to be processed by performing a target processing on the initial signal based on the period information; and a second processing module 303, configured to obtain a target frequency domain signal by performing a frequency domain transformation on the signal to be processed.

In some embodiments of the disclosure, the first processing module 302 is configured to:

obtain the signal to be processed by performing the target processing on the initial signal based on the period information, in which a first amount of computation for performing the frequency domain transformation based on the signal to be processed is less than a second amount of computation for performing the frequency domain transformation based on the initial signal.

In some embodiments of the disclosure, the obtaining module 301 is configured to:

obtain preamble format information of a PRACH;

determine, based on the preamble format information, a target number of points for performing the frequency domain transformation on the initial signal based on the format information; and determine the period information corresponding to the initial signal based on the target number of points.

In some embodiments of the disclosure, the first processing module 302 is further configured to:

obtain a first sequence number parameter in the initial signal;

determine a multiplicative inverse corresponding to the first sequence number parameter based on the period information;

determine a sequence of parameters corresponding to the period information, wherein the sequence of parameters comprises a plurality of second sequence number parameters;

determine a plurality of target sequence values corresponding to the plurality of second sequence number parameters respectively based on the initial signal;

extract a plurality of target conjugate values corresponding to the plurality of target sequence values, respectively; and obtain the signal to be processed by summing up the plurality of target conjugate values based on the initial signal.

In some embodiments of the disclosure, the second processing module 303 is configured to:

obtain the target frequency domain signal by performing a DFT on the signal to be processed.

In some embodiments of the disclosure, the signal to be processed is a baseband signal.

Corresponding to the method for processing a PRACH signal provided in the above-described embodiments of FIGS. 1 to 2, the disclosure also provides an apparatus for processing a PRACH signal. Since the apparatus for processing a PRACH signal provided in the embodiments of the disclosure corresponds to the method for processing a PRACH signal provided in the above-described embodiments of FIGS. 1 to 2, the implementations of the method for processing a PRACH signal are also applicable to the apparatus for processing a PRACH signal provided in the embodiments of the disclosure, which will not be described in detail in the embodiments of the disclosure.

In the embodiments of the disclosure, the initial signal is obtained, and the initial signal has corresponding period information. The signal to be processed is obtained by performing the target processing on the initial signal based on the period information. The target frequency domain signal is obtained by performing the frequency domain transformation on the signal to be processed. Therefore, the amount of computation can be effectively reduced during execution of the method for processing a PRACH signal, thus the speed of computation can be effectively increased, and the power consumption of signal processing can be effectively reduced, which is more conducive to the implementation of hardware.

In order to implement the above embodiments, the disclosure also provides an electronic device. The electronic device includes: a memory, a processor, and computer programs stored in the memory and executable on the processor. When the computer programs are executed by the processor, the method for processing a PRACH signal provided by the above embodiments of the disclosure is implemented.

In order to implement the above embodiments, the disclosure also provides a non-transitory computer readable storage medium having computer programs stored thereon. When the computer programs are executed by a processor, the method for processing a PRACH signal provided by the above embodiments of the disclosure is implemented.

In order to implement the above embodiments, the disclosure also provides a computer program product having instructions stored thereon. When the instructions are executed by a processor, the method for processing a PRACH signal provided by the above embodiments of the disclosure is implemented.

Figure 4:
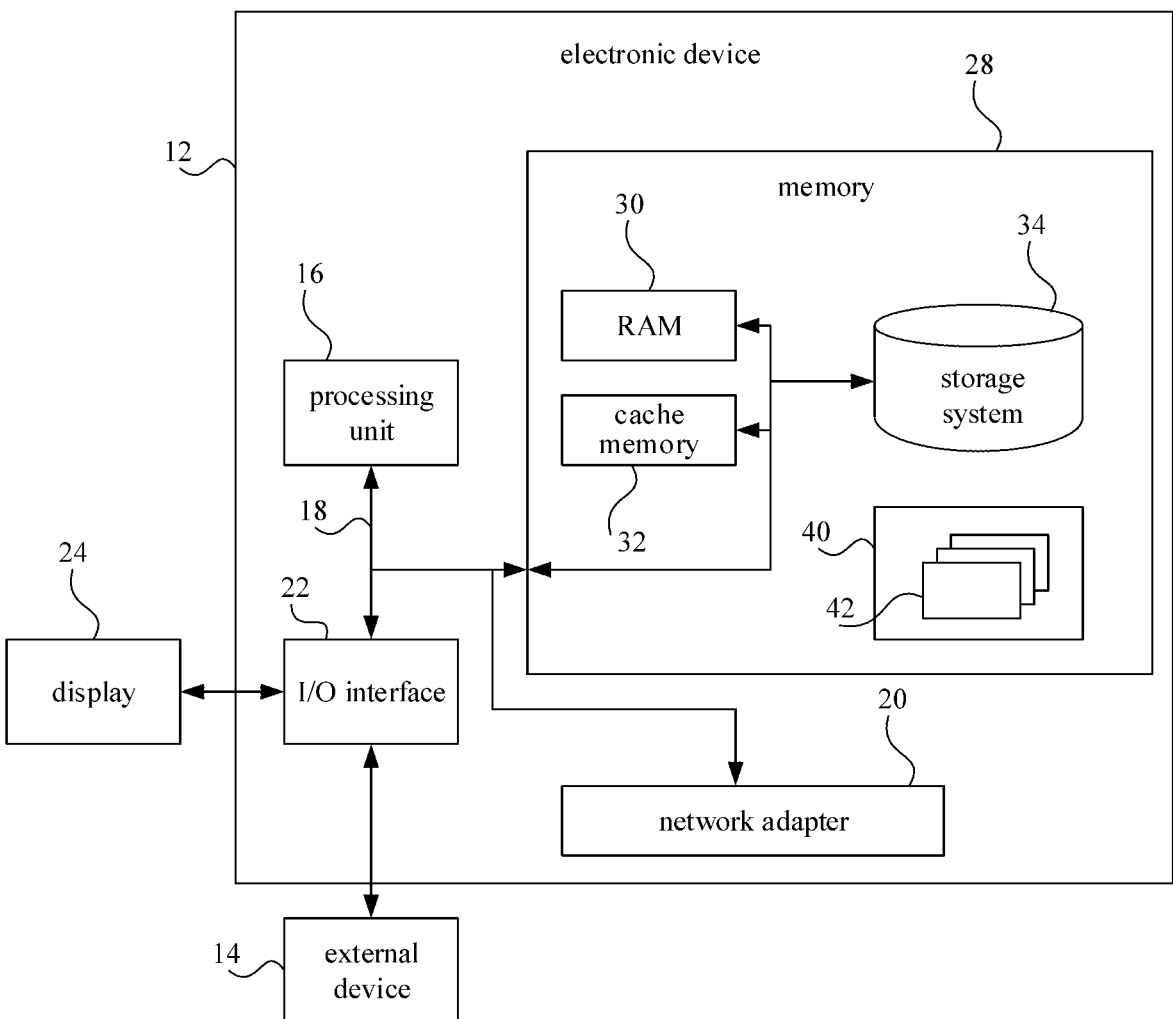
FIG. 4 is a block diagram of an exemplary electronic device suitable for realizing implementations of the disclosure.

FIG. 4 is a block diagram of an exemplary electronic device suitable for realizing implementations of the disclosure. The electronic device 12 shown in FIG. 4 is merely an example and should not impose any limitation on the function and scope of use of the embodiments of the disclosure.

As illustrated in FIG. 4, the electronic device 12 is represented in the form of a general computing device. Components of the electronic device 12 may include, but are not limited to: one or more processors or processing units 16, a system memory 28, a bus 18 connecting different system components, including the system memory 28 and the processing unit 16.

The bus 18 represents one or more of several types of bus structures, including a memory bus or memory controller, a peripheral bus, a graphics acceleration port, a processor or a local area bus using any of the multiple bus architectures. For example, these architectures include, but are not limited to, an Industry Standard Architecture (ISA) bus, a Micro Channel Architecture (MAC) bus, an Enhanced ISA bus, a Video Electronics Standards Association (VESA) local area bus, and a Peripheral Component Interconnection (PCI) bus.

The electronic device 12 typically includes a variety of computer system readable mediums. These mediums may be any available medium that can be accessed by the electronic device 12, including volatile and non-volatile mediums, removable and non-removable mediums.

The electronic device 12 typically includes a variety of computer system readable mediums. These mediums may be any available medium that can be accessed by the electronic device 12, including volatile and non-volatile mediums, and removable and non-removable mediums.

The memory 28 may include computer system readable mediums in the form of volatile memories, such as a Random Access Memory (RAM) 30 and/or a cache memory 32. The electronic device 12 may further include other removable/non-removable, volatile/non-volatile computer system storage mediums. By way of example only, the storage system 34 may be used to read and write non-removable, non-volatile magnetic mediums (not shown in FIG. 4, commonly referred to as "hard disk drives").

Although not shown in FIG. 4, disk drives for reading and writing removable non-volatile disks (e.g., "floppy disks"), and optical disk drives for reading and writing removable non-volatile optical disks (e.g., Compact Disc Read Only Memory (CD-ROM), and Digital Video Disc Read Only Memory (DVD-ROM), or other optical mediums). In these conditions, each drive may be connected to the bus 18 via one or more data media interfaces. The memory 28 may include at least one program product having a set (e.g., at least one) of program modules that are configured to perform the functions of the embodiments of the disclosure.

A program/utility 40 having a set of (at least one of) program modules 42 may be stored in, for example, the memory 28, such program modules 42 include, but are not limited to, an operating system, one or more applications, other program modules and program data. Each of these examples or some combinations thereof may include an implementation of network environment. The program module 42 typically performs functions and/or methods in the embodiments described in this disclosure.

The electronic device 12 may also communicate with one or more external devices 14 (e.g., a keyboard, a pointing device, and a display 24), one or more devices that enable the user to interact with the electronic device 12, and/or with any device (e.g., a network card, and a modem) that enables the electronic device 12 to communicate with one or more other computing devices. This communication may be via an input/output (I/O) interface 22. Moreover, the electronic device 12 may also communicate with one or more networks (e.g., Local Area Network (LAN), Wide Area Network (WAN), and/or public networks, such as the Internet) through the network adapter 20. As shown, the network adapter 20 communicates with other modules of the electronic device 12 via the bus 18. It should be noted that although not shown in the figures, other hardware and/or software modules may be used in combination with the electronic device 12, including but not limited to: microcode, device drivers, redundant processing units, external disk driver arrays, RAID (Redundant Arrays of Independent Disks) systems, tape drivers, and data backup storage systems.

The processing unit 16 performs various functional applications and data processing by running programs stored on the system memory 28, such as implementing the method for processing a PRACH signal mentioned in the preceding embodiments.

Other embodiments of the disclosure will be apparent to those skilled in the art from consideration of the specification and practice of the disclosure disclosed here. This application is intended to cover any variations, uses, or adaptations of the disclosure following the general principles this disclosure and including common knowledge or customary technical means in the related art that are not disclosed in this disclosure. It is intended that the specification and embodiments may be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

It should be noted that in the description of the disclosure, the terms "first" and "second" are used for descriptive purposes only and should not be construed as indicating or implying relative importance. In addition, in the description of the disclosure, unless otherwise specified, "plurality" means two or more.

Any process or method described in a flowchart or described herein in other ways may be understood to include one or more modules, segments or portions of codes of executable instructions for achieving specific logical functions or steps in the process, and the scope of a preferred embodiments of the disclosure includes other implementations, which may perform functions not in the order shown or discussed, such as in a substantially simultaneous manner or in the reverse order, depending on the functions involved, as should be understood by those skilled in the art to which the embodiments of the disclosure belong.

It should be understood that each part of the disclosure may be realized by the hardware, software, firmware or their combination. In the above embodiments, a plurality of steps or methods may be realized by the software or firmware stored on the memory and executed by an appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a Programmable Gate Array (PGA), a Field Programmable Gate Array (FPGA), etc.

It would be understood by those skilled in the art that all or a part of the steps carried by the method in the above-described embodiments may be completed by relevant hardware instructed by a program. The program may be stored in a computer readable storage medium. When the program is executed, one or a combination of the steps of the method in the above-described embodiments may be completed.

In addition, individual functional units in the embodiments of the disclosure may be integrated in one processing module or may be separately physically present, or two or more units may be integrated in one module. The integrated module as described above may be achieved in the form of hardware, or may be achieved in the form of a software functional module. If the integrated module is achieved in the form of a software functional module and sold or used as a separate product, the integrated module may also be stored in a computer readable storage medium.

The storage medium mentioned above can be ROMs, disks or CD-ROMs.

Reference throughout this specification to "an embodiment," "some embodiments," "an example," "a specific example," or "some examples," means that a particular feature, structure, material, or characteristic described in combination with the embodiment or example is included in at least one embodiment or example of the disclosure. The appearances of the above phrases in various places throughout this specification are not necessarily referring to the same embodiment or example of the disclosure. Furthermore, the particular features, structures, materials, or characteristics may be combined in any suitable manner in one or more embodiments or examples.

Although embodiments of disclosure have been shown and described above, it should be understood that above embodiments are just explanatory, and cannot be construed to limit the disclosure, for those skilled in the art, changes, alternatives, and modifications can be made to the embodiments without departing from spirit, principles and scope of the disclosure.

What is claimed is:

1. A method for processing a Physical Random Access Channel (PRACH) signal, comprising:

obtaining an initial signal and a first sequence number parameter in the initial signal, wherein the initial signal has corresponding period information, and the initial signal is represented as:

$$s_l^{(p,\mu)}(t) = \sum_{k=0}^{L_{RA}-1} \beta_{PRACH} y_{u,v}(n) e^{j2\pi(k+\varphi+k~(k_0+1/2))\Delta f_{RA}(t-T_{cp})},$$

where $$s_1^{(p,\mu)}(t)$$

represents a time-domain continuous signal of a PRACH at an antenna port p, t represents a time sequence number, $\Delta f_{RA}$ represents a subcarrier spacing of a random access preamble, $\mu$ represents subcarrier spacing configuration, $\beta_{PRACH}$ represents a power control adjustment factor, $\varphi$ represents a fixed frequency domain offset, $L_{RA}$ represents a sequence length corresponding to the initial signal, u represents a root sequence index, $k_0$ represents a starting location of a resource block occupied by the PRACH, k represents an index of a resource block within an occupied bandwidth, $T_{cp}$ represents a length of a cyclic prefix, n represents a sequence index, $y_{u,v}(n)$ represents a frequency-domain Zadoff-Chu sequence, and j represents an imaginary component;

determining a multiplicative inverse corresponding to the first sequence number parameter based on the period information;

determining a sequence of parameters corresponding to the period information, wherein the sequence of parameters comprises a plurality of second sequence number parameters;

determining a plurality of target sequence values corresponding to the plurality of second sequence number parameters respectively based on the initial signal;

extracting a plurality of target conjugate values corresponding to the plurality of target sequence values, respectively;

obtaining the signal to be processed by summing up the plurality of target conjugate values based on the initial signal; and obtaining a target frequency domain signal by performing a frequency domain transformation on the signal to be processed.

2. The method of claim 1, wherein a first amount of computation for performing the frequency domain transformation on the signal to be processed is less than a second amount of computation for performing the frequency domain transformation on the initial signal.

3. The method of claim 2, wherein obtaining the initial signal comprises:
    obtaining preamble format information of the PRACH;
    determining, based on the preamble format information, a target number of points for performing the frequency domain transformation on the initial signal; and
    determining the period information corresponding to the initial signal based on the target number of points.

4. The method of claim 1, wherein obtaining the initial signal comprises:
    obtaining preamble format information of the PRACH;
    determining, based on the preamble format information, a target number of points for performing the frequency domain transformation on the initial signal; and
    determining the period information corresponding to the initial signal based on the target number of points.

5. The method of claim 1, wherein obtaining the target frequency domain signal by performing the frequency domain transformation process on the signal to be processed comprises:
    obtaining the target frequency domain signal by performing a Discrete Fourier Transformation (DFT) on the signal to be processed.

6. The method of claim 1, wherein the signal to be processed is a baseband signal.

7. An electronic device, comprising:
    at least one processor; and
    a memory communicatively connected to the at least one processor; wherein
    the memory stores instructions executable by the at least one processor, and when the instructions are executed by the at least one processor, the at least one processor is caused to implement a method or processing a Physical Random Access Channel (PRACH) signal, comprising:
    obtaining an initial signal and a first sequence number parameter in the initial signal, wherein the initial signal has corresponding period information, and the initial signal is represented as:

$$s_l^{(p,\mu)}(t) = \sum_{k=0}^{L_{RA}-1} \beta_{PRACH} y_{u,v}(n) e^{j2\pi(k+\varphi+k\ (k_0+1/2))\Delta f_{RA}(t-T_{cp})},$$

where $$s_1^{(p,\mu)}(t)$$

represents a time-domain continuous signal of a PRACH at an antenna port p, t represents a time sequence number, $\Delta f_{RA}$ represents a subcarrier spacing of a random access preamble, $\mu$ represents subcarrier spacing configuration, $\beta_{PRACH}$ represents a power control adjustment factor, $\varphi$ represents a fixed frequency domain offset, $L_{RA}$ represents a sequence length corresponding to the initial signal, u represents a root sequence index, $k_0$ represents a starting location of a resource block occupied by the PRACH, k represents an index of a resource block within an occupied bandwidth, $T_{cp}$ represents a length of a cyclic prefix, n represents a sequence index, $y_{u,v}(n)$ represents a frequency-domain Zadoff-Chu sequence, and j represents an imaginary component;

determining a multiplicative inverse corresponding to the first sequence number parameter based on the period information;
determining a sequence of parameters corresponding to the period information, wherein the sequence of parameters comprises a plurality of second sequence number parameters;
determining a plurality of target sequence values corresponding to the plurality of second sequence number parameters respectively based on the initial signal;
extracting a plurality of target conjugate values corresponding to the plurality of target sequence values, respectively;
obtaining the signal to be processed by summing up the plurality of target conjugate values based on the initial signal; and
obtaining a target frequency domain signal by performing a frequency domain transformation on the signal to be processed.

8. The electronic device of claim 7, wherein obtaining the initial signal comprises:
    obtaining preamble format information of the PRACH;
    determining, based on the preamble format information, a target number of points for performing the frequency domain transformation on the initial signal; and
    determining the period information corresponding to the initial signal based on the target number of points.

9. The electronic device of claim 7, wherein obtaining the target frequency domain signal by performing the frequency domain transformation process on the signal to be processed comprises:
    obtaining the target frequency domain signal by performing a Discrete Fourier Transformation (DFT) on the signal to be processed.

10. The electronic device of claim 7, wherein the signal to be processed is a baseband signal.

11. A non-transitory computer readable storage medium having computer instructions stored thereon, wherein the computer instructions are configured to cause a computer to implement a method for processing a Physical Random Access Channel (PRACH) signal, comprising:
    obtaining an initial signal and a first sequence number parameter in the initial signal, wherein the initial signal has corresponding period information, and the initial signal is represented as:

$$s_l^{(p,\mu)}(t) = \sum_{k=0}^{L_{RA}-1} \beta_{PRACH} y_{u,v}(n) e^{j2\pi(k+\varphi+k\ (k_0+1/2))\Delta f_{RA}(t-T_{cp})},$$

where $$s_1^{(p,\mu)}(t)$$

represents a time-domain continuous signal of a PRACH at an antenna port p, t represents a time sequence number, $\Delta f_{RA}$ represents a subcarrier spacing of a random access preamble, $\mu$ represents subcarrier spacing configuration, $\beta_{PRACH}$ represents a power control adjustment factor, $\varphi$ represents a fixed frequency domain offset, $L_{RA}$ represents a sequence length corresponding to the initial signal, u represents a root sequence index, $k_0$ represents a starting location of a resource block occupied by the PRACH, k represents an index of a resource block within an occupied bandwidth, $T_{cp}$ represents a length of a cyclic prefix, n represents a sequence index, $y_{u,v}(n)$ represents a frequency-domain Zadoff-Chu sequence, and j represents an imaginary component;

determining a multiplicative inverse corresponding to the first sequence number parameter based on the period information;

determining a sequence of parameters corresponding to the period information, wherein the sequence of parameters comprises a plurality of second sequence number parameters;

determining a plurality of target sequence values corresponding to the plurality of second sequence number parameters respectively based on the initial signal;

extracting a plurality of target conjugate values corresponding to the plurality of target sequence values, respectively;

obtaining the signal to be processed by summing up the plurality of target conjugate values based on the initial signal; and obtaining a target frequency domain signal by performing a frequency domain transformation on the signal to be processed.

12. The non-transitory computer readable storage medium of claim 11, wherein obtaining the initial signal comprises:

obtaining preamble format information of the PRACH;

determining, based on the preamble format information, a target number of points for performing the frequency domain transformation on the initial signal; and determining the period information corresponding to the initial signal based on the target number of points.

13. The non-transitory computer readable storage medium of claim 11, wherein obtaining the target frequency domain signal by performing the frequency domain transformation process on the signal to be processed comprises:

obtaining the target frequency domain signal by performing a Discrete Fourier Transformation (DFT) on the signal to be processed.

14. The non-transitory computer readable storage medium of claim 11, wherein the signal to be processed is a baseband signal.

\* \* \* \* \*